United States Patent [19]

Tsuda et al.

[11] Patent Number: 5,115,306
[45] Date of Patent: May 19, 1992

[54] PROJECTION CRT WITH A GREEN EMITTING TERBIUM ACTIVATED LANTHANUM OXYCHLORIDE PHOSPHOR EXHIBITING NEARLY CONSTANT LIGHT-OUTPUT OF ELEVATED TEMPERATURES

[75] Inventors: Nobuyuki Tsuda, Kawasaki; Masaaki Tamatani, Fujisawa; Fukaya Ajiro; Nagai Hitosi, both of Fukaya, all of Japan

[73] Assignee: Tokyo Shibaura Denki Kabushiki Kaisha, Kawasaki, Japan

[21] Appl. No.: 887,950

[22] Filed: May 29, 1986

Related U.S. Application Data

[63] Continuation of Ser. No. 552,986, Nov. 17, 1983, abandoned.

[30] Foreign Application Priority Data

Nov. 18, 1982 [JP] Japan ................. 57-201159

[51] Int. Cl.$^5$ ............ H04N 9/31; H01J 29/10; C09K 11/08
[52] U.S. Cl. .................. 358/60; 313/468; 252/301.4 F
[58] Field of Search ........... 358/60; 252/301.4 F, 252/301.4 H, 301.4 F, 301.4 H; 313/478, 468; 427/73

[56] References Cited

U.S. PATENT DOCUMENTS

| | | | |
|---|---|---|---|
| 2,650,884 | 9/1953 | Pakswer et al. | 427/73 |
| 2,793,137 | 5/1957 | Friedman | 427/73 |
| 3,591,516 | 7/1971 | Rabatin | 252/301.9 H |
| 3,617,743 | 11/1971 | Rabatin et al. | 313/468 |
| 3,996,472 | 12/1976 | Rabatin | 252/301.9 H |
| 4,099,089 | 7/1978 | Rabatin | 252/301.4 H |
| 4,208,470 | 6/1980 | Rabatin | 252/301.4 H |
| 4,436,646 | 3/1984 | Takahara et al. | 313/468 |
| 4,518,985 | 5/1985 | Tamatani et al. | 358/60 |
| 4,547,699 | 10/1985 | Fitzpatrick | 313/478 |
| 4,559,469 | 12/1985 | Welker et al. | 252/301.4 H |
| 4,604,550 | 8/1986 | van Koesveld et al. | 313/468 |

OTHER PUBLICATIONS

F. A. Kröger, "Some A . . . Luminescence of . . . ", 1948, pp. 118–119, 182–187, 192–193.
Sakamoto, H., "Luminescent Materials and Their Application for Cathode-Ray Tubes", Electronic Ceramics, Jan. 1980, pp. 65, 68.
Chemical Abstracts, vol. 65 (1966), Abstract No. 17884(g).
Tsuda, Nobuyuki et al., "Green Emitting Phosphor for Projection CRTs", in Synopsis of the Lecture of the Phosphor Research Society in Japan, No. 199 (Feb. 3, 1984).
C. G. A. Hill, "Cathode Ray Tube Phosphors", Society For Information Display, vol. II, Jun. 1984, pp. 6, 2–9.
A. Brill, et al., "Intrinsic Efficiencies of Phosphors Under Cathode Ray Excitation", Philips Research Reports, vol. 7, No. 6, Dec. 1952, pp. 401, 408–411.

Primary Examiner—James J. Groody
Attorney, Agent, or Firm—Foley & Lardner

[57] ABSTRACT

A projection cathode-ray tube for a projection video apparatus, comprising a green-emitting screen including a terbium-activated lanthanum oxychloride phosphor. The disclosed phosphor exhibits a luminance maximum at a minimum beam size, a property advantageous for producing a high-resolution image. The phosphor is chemically stable at high temperatures. The phosphor shows no substantial decrease in emission efficiency even at about 80° C., and the emission luminance is twofold that of the prior art. The green-emitting screen is made by the steps of: (a) settling the terbium-activated lanthanum oxychloride phosphor onto the inner surface of a cathode-ray tube, wherein the phosphor is settled from a suspension comprising a solution of potassium water glass and barium nitrate, and wherein the ratio of the weight concentration of potassium water glass to barium nitrate is in the range between about 20 to about 35; and (b) removing the resulting supernatant.

3 Claims, 5 Drawing Sheets

PROJECTION CRT WITH A GREEN EMITTING TERBIUM ACTIVATED LANTHANUM OXYCHLORIDE PHOSPHOR EXHIBITING NEARLY CONSTANT LIGHT-OUTPUT OF ELEVATED TEMPERATURES

This is a continuation of application Ser. No. 552,986, filed Nov. 17, 1983, abandoned.

BACKGROUND OF THE INVENTION

The present invention relates to a projection cathode-ray tube having improved high-temperature characteristics.

At present, there are commercially available color projection video apparatuses in which three high-luminance cathode-ray tube emitting blue, green and red colors a juxtaposed, and the pictures on these tubes are enlarged by optical lenses and projected onto a large screen to reproduce color images thereon. This video apparatus has heretofore frequently been used for reproduction of television pictures for educational and amusement purposes, and it is expected in the future to be broadened in scope of applications as a high definition and high resolution television broadcasting or video system. In this color projection video apparatus, in order to make the brightness on the large screen as high as possible, it is required to apply an electron beam energy of tenfold or more, as compared with a conventional direct-view color cathode-ray tube, onto the luminescent screen of the above cathode-ray tube. Accordingly, the temperature on the luminescent screen is elevated to 60° C. or higher by ordinary operation. Generally speaking, the brightness on the luminescent screen is known to be lowered as the temperature is elevated. Further, the efficiency on the luminescent screen is generally lower under a high density electron beam, with the spot size of electron beam on the cathode-ray tube being about 1/5 of that of the direct-view color cathode-ray tube for obtaining clear images on the enlarges picture screen. Therefore, considerations different from those of the direct-view cathode-ray tube should be taken into account for the cathode-ray tube for the projection apparatus with respect to the structure of the cathode-ray tube and the phosphor constituting the luminescent screen.

For example, a cathode-ray tube is known, in which the temperature elevation of the luminescent screen is suppressed to some extent with a structure capable of holding a water layer on the outside of the cathode-ray tube. Forced air cooling by blasting the air against the outside of the luminescent screen of the cathode-ray tube by means of a fan is also known. However, according to these methods, there are involved the drawbacks such that the structure of the cathode-ray tube becomes complicated or that the production cost is increased.

As the red phosphor in projection CRT's, europium-activated yttrium oxide has been used because yttrium oxysulfide, frequently used in the direct-view color cathode-ray tube, is markedly lowered in emission efficiency at high temperatures. For the blue phosphor, silver-activated zinc sulfide having high emission efficiency has been used. For the green phosphor, manganese-activated zinc silicate or terbium-activated gadolinium oxysulfide has been employed, because a zinc sulfide type phosphor frequently used in the direct-view type color cathode-ray tube is markedly lowered in emission efficiency under the high electron beam energy density.

With reference to reproduction of a white picture synthesized by the red, green and blue emitting phosphors on the projected screen, about 70 percent of its luminance is contributed from the green element, Therefore, among the red-, blue- and green-emitting phosphors, improvement in emission efficiency particularly of the green-emitting phosphor will lead to a high luminance of the color projection video apparatus. Whereas, manganese-activated zinc silicate used for the green emitting phosphor of the prior art is as low as 79% in energy conversion efficiency from input electron beam to light output. Furthermore, it often shows luminescent screen deterioration under electron bombardment, which is so-called "electron burning". Moreover, it has the drawback of long decay time of luminescence after cessation of electron beam excitation which makes moving pictures tent to be tailed on the projected screen. On the other hand, terbium-activated gadolinium oxysulfide has the drawback of marked lowering of efficiency with temperature elevation, although it has high luminescence efficiency at room temperature of 10% or more. Therefore, under ordinary operation, the conventional projection type video device cathode-ray tube employing terbium-activated gadolinium oxysulfide has brightness only comparable to that employing manganese-activated zinc silicate. Further, due to efficiency lowering of the green-emitting CRT with temperature elevation, the projected image changes in color with the initial temperature elevation of the cathode-ray tubes during about 10 minutes after commencement of picture projection, whereby cumbersome color readjustment is required.

In addition to high luminescence efficiency at high temperatures, the following conditions are also necessary with respect to the color image reproduction comparable to that of the direct-view type color cathode-ray tube. As the emitted light from a green phosphor is greater in value x and smaller in value y in the CIE chromaticity diagram, namely more intensified in yellowish hue, the sum of the electron beam energy of blue, green and red cathode-ray tubes becomes smaller when constituting a white picture, whereby the emission efficiency of the video device as a whole is enhanced. On the other hand, for increasing the color reproduction area of pictures, the emitted light is desired to be as near to the edge (i.e., great in saturation degree of color) on the chromaticity diagram as possible. In accordance with the above viewpoint, in the direct-view color cathode-ray tube, the green component is selected so as to exhibit a chromaticity of $0.30 < x < 0.34$ and $0.57 < y$. Meanwhile, in a projection type, the emitted color of the green phosphor comprising maganese-activated zinc silicate is $x = 0.23$ and $y = 0.69$ to be strongly hued with green, whereby the emission efficiency of the video device as a whole will be lowered. Also, in the case of the phosphor with the use of terbium-activated gadolinium oxysulfide, its emitted color is $x = 0.325$ and $y = 0.543$, thus involving the drawback of a lower degree of saturation (purity).

Other than the green phosphors described above, terbium-activated rare earth oxyhalide phosphors are show to show high efficiency under electron beam or under X-ray excitation. These phosphors are disclosed in Philips Research Report, Vol. 22, page 481, published in 1967. The phosphor host compounds in this paper are lanthanum oxybromide, lanthanum oxychlroide, lanthanum oxyfluoride, yttrium oxyfluoride, yttrium oxychloride and yttrium oxybromide.

Among the above phosphors, particularly lanthanum and gadolinium oxyhalides, J. G. Rabitin discloses in Japanese Kokoku 49-34310 that good results be obtained by applying these materials on the luminescent screen of X-ray image converter through utilization of high efficiency under X-ray excitation possessed by these materials. Particularly, the lanthanum oxybromide phosphor is stated to give the highest emission efficiency by X-ray excitation and suitable for X-ray sensitizing screen. Further, there is a disclosure that the above bromide phosphor also shows high luminescence efficiency and good high-temperature characteristics even by electron beam excitation (see The Extended Abstract No. 306 in the Annual Meeting of American Society of Electrochemistry, in Autumn, 1979). There is also a disclosure that it can be utilized for a monochrome projection video apparatus (emitted color becomes white at low terbium concentration) to give good results (see The Extended Abstract No. 153 in the Annual Meeting of American Society of Electrochemistry, in Spring, 1981).

The present inventors tried to apply lanthanum oxybromide chosen from the above phosphors for the green-emitting projection cathode-ray tube, but could not obtain good results. The emitted color lies at x=0.35 and y=0.57 on the CIE chromaticity diagram, and was too yellowish for the green component required in the present invention. Moreover, when applied to a projection CRT, the luminescence intensity steeply decreases above 80° C. Further, this phosphor is chemically unstable and it was found that adherence strength between the phosphor screen and the glass face-plate of the cathode-ray tube is weak during the phosphor screening process and that it was difficult to obtain a uniform luminescent screen.

The present inventors, since the bromide phosphor proved to be inapplicable for the green-emitting projection CRT for the reasons as mentioned above, have studies further on other rare earth oxyhalide phosphors.

Yttrium oxychlroide, which is stated to have high luminance and high efficiency, was found to be chemically unstable, resulting in difficulty in forming a good luminescent screen. Oxyfluoride phosphors were found to cause reaction with a quartz crucible during phosphor firing process, whereby purity is lowered or mass-production phosphor preparation becomes difficult. Only terbium-activated lanthanum oxychloride was found to suit our objects.

SUMMARY OF THE INVENTION

The present invention is a green-emitting projection CRT whose luminescent screen is formed by a terbium-activated lanthanum oxychloride phosphor. This CRT is excellent in high temperature characteristics and performance at high current density.

DETAILED DESCRIPTION OF THE PREFERRED EMBODIMENTS

The green-emitting terbium-activated lanthanum oxychloride phosphor screen is formed by a settling method on the inner surface of the CRT in a mixed aqueous solution comprising potassium water glass and barium nitrate. When the weight concentration of the water glass in the mixed aqueous solution ($K_2O.3SiO_2$) is represented by WG and that of barium nitrate ($Ba(NO_3)_2$) by Ba, the ratio of WG/Ba is controlled to 20 to 35. Adhesion strength of the luminescent screen to the face plate glass of the CRT is reduced to cause peel-off phenomenon beyond this WG/Ba range.

Red-emitting and blue-emitting cathode-ray tubes are made by employing a europium-activated yttrium oxide ($Y_2O_3$:Eu) and silver activated zinc sulfide (ZnSiAg), respectively, as the luminescent screens.

Figure 1:
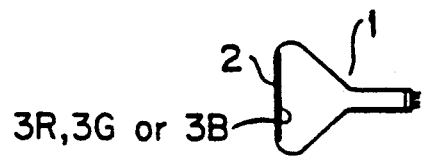
FIG. 1 shows a side elevational view of a conventional cathode-ray tube.
Figure 2:
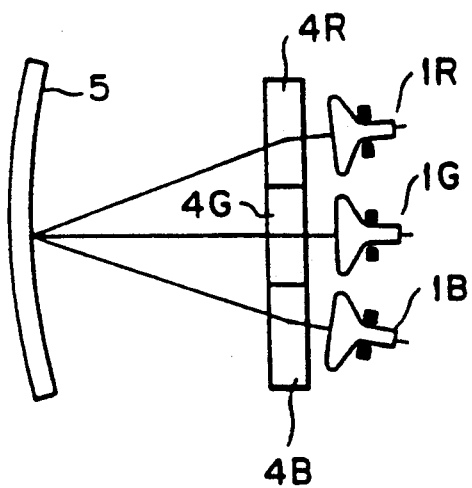
FIG. 2 is a schematic illustration of the device of a prior art.

The color projection video apparatus is constructed by arranging the cathode-ray tube 1R, 1G, and 1B having the above-described phosphor screens as shown in FIG. 1. Lenses 4R, 4G and 4B are provided in front of the luminescent screens. The lenses control the light radiated from the respective luminescent screens. The light is focused on a screen 5 provided at a predetermined distance from the cathode-ray tubes.

To each of the above cathode-ray tubes 1R, 1G and 1B is applied an operation voltage of about 28 kV, by which an electron beam is emitted against the luminescent screen to produce luminescence. The luminescent screen thus obtained shows a luminescence screen color at x=0.33 and y=0.59 by selecting appropriate amount of terbium incorporated and can be sufficiently be utilized as the green element for tri-color projection video apparatus. As for the afterglow characteristic, it takes about 2 milliseconds for the light intensity to decay to 10% of its value just before ceasing the excitation. This 10% decay time is sufficiently short to obtain moving pictures without tailing. Temperature of the cathode-ray tubes reach 60° to 80° C. in about 10 minutes after commencement of the operation. The green-emitting phosphor screen showed no substantial decrease in emission efficiency even at about 80° C., and the emission luminance was twofold as compared with that of the prior art. Also, substantially no decrease in luminance occurred in the red emitting phosphor screen and the blue-emitting phosphor screen at high temperatures. Therefore, substantially no color change in the projected TV pictures was observed with lapse of time. The green-emitting luminescent screen was found to exhibit a peculiar characteristic that the emission efficiency is increased when the spot size of the electron beam is made smaller, which is advantageous in obtaining TV pictures of high quality.

When a cathode-ray tube employing this phosphor was subjected to the forced aging test by applying a voltage to the cathode-ray tube while controlling the temperature on the luminescent screen to about 100° C., the initial characteristics were maintained even after 1000 hours without any deterioration observed.

EXAMPLES 1 TO 6

For the green-emitting phosphor, 100 g of lanthanum oxide, 58 g of ammonium chloride and 14 g of terbium oxide were weighed and mixed thoroughly with each other. The mixture was put in a quartz crucible. An appropriate amount of graphite powder was placed in the mixture and a lid was used to cover over the crucible. Calcination at 1200° C. for 2 hours followed. Without carbon powder, calcination may be carried out in a reducing atmosphere. The calcined product was sieved in water through nylon mesh, thoroughly washed several times by decantation, filtered with alcohol and dried to prepare a terbium-activated lanthanum oxychloride phosphor.

Next, 1.0 g of the above green-emitting phosphor was suspended in 200 ml aqueous solution consisting of 25% potassium water glass and pure water. Into a 7 inch cathode-ray tube was placed a mixture made up to a total amount of 400 ml of 2% barium nitrate solution and deionized water. The above suspension was poured into the tube and allowed to stand for 30 minutes. After the phosphor settled to form a screen, the supernatant was decanted. The amount of the 25% water glass solution added; the amount of the 2% barium nitrate solution, the concentration ratio of water glass to barium nitrate (WG/Ba) contained in the aqueous solution during the above settling process; the transparency degrees of the settling solutions; and the appearance of the resultant settled screens and luminances of the cathode-ray tubes prepared by the processes as hereinafter described, are all shown in Table 1 as Examples 1 to 6. In Examples 1 to 6, within the range of 20<WG/Ba<35, the settling solutions are transparent and phosphor screens are formed with sufficient adherence strength. But, in comparative Examples 1 to 5, when WG/Ba is outside the above range, no good phosphor screens were formed. In Table 1, good products are indicated by [A], bad products by [C] and products grouped therebetween by [B].

"dead voltage" of the settled screen is in the range from 3.7 kV to 4.5 kV, and the difference of 0.8 kV will not appear as a great difference during operation with 28 kV. The increase of "dead voltage" by baking was found to be 0.2 kV, which was negligible so far as the cathode-ray luminance was concerned.

Figure 3A:
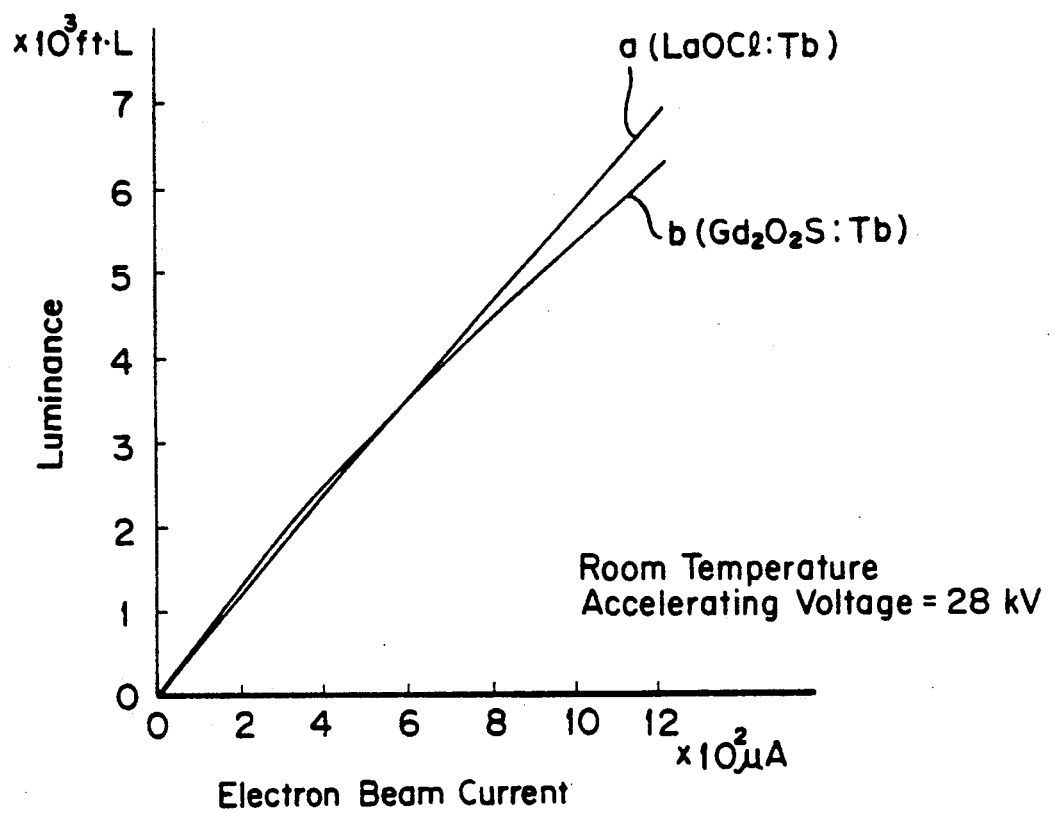
FIG. 3a, FIG. 3b, FIG. 4 and FIG. 5 are characteristic curves showing test data for luminance.
Figure 3B:
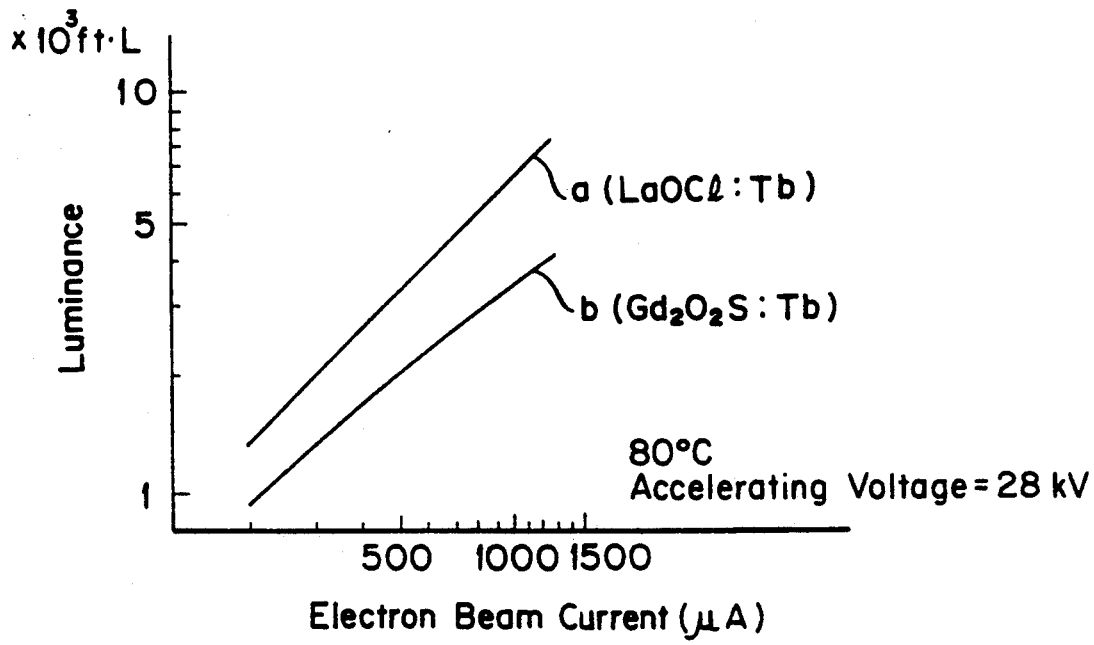

The luminance, obtained from the cathode-ray tube of the green-emitting phosphor screen used in the examples at an accelerating voltage of 28 kV, was measured versus the electron beam current applied. FIGS. 3a and 3b show the results at face plate temperatures of room temperature and 80° C., respectively. Even at an electron beam current of 600 μA or higher, the luminance of the tube using the LaOCl: Tb phosphor is proportional to the electron beam current, thus indicating clearly that the phosphor is suitable for the color projection video apparatus.

Figure 4:
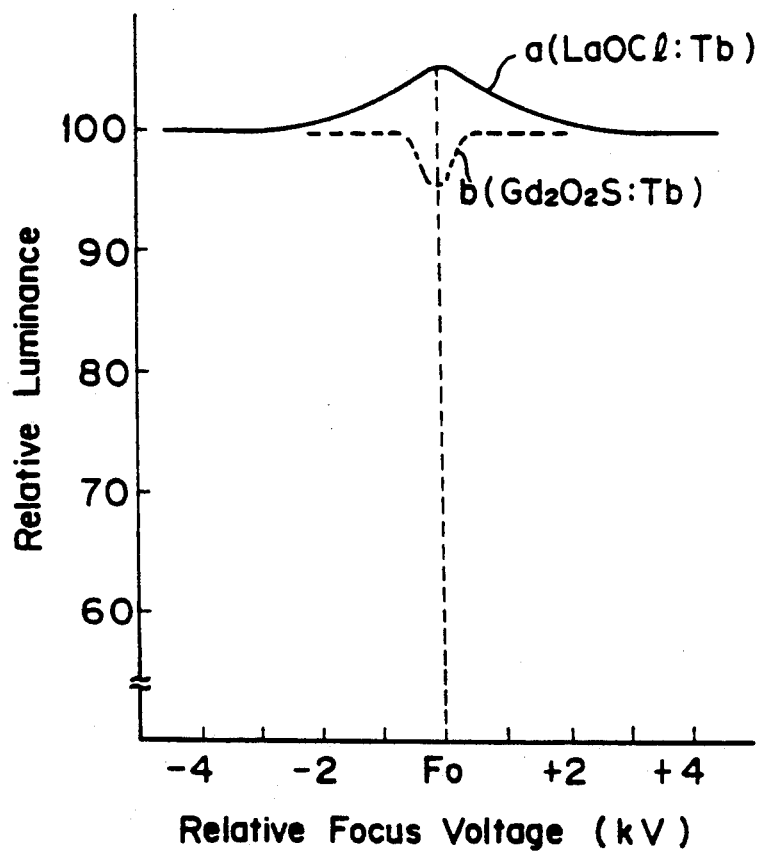

FIG. 4 shows the relative luminance when the electron beam size was varied. The electron beam size was varied here by varying the voltage supplied to the focus grid of the cathode-ray tube. The electron beam size becomes minimum at the relative focus voltage of 0 kV (indicated by $F_o$), and increases at voltages toward both positive and negative directions. While it is generally known in ordinary phosphors that luminance is lowered to the minimum beam size, i.e., maximum current density, the terbium-activated lanthanum oxychloride exhibits a luminance maximum at the minimum beam size as shown by the curve a in FIG. 4. Though the reason for this is not known yet, this is advantageous for producing a high-resolution projection picture image. For comparison, the curve of the cathode-ray tube employ-

TABLE 1

| Cathode-ray tube used in Examples | 25% water glass (ml) | barium nitrate (ml) | WG/Ba | Transparency degree of settling Solution | Phosphor screen | Relative luminance |
| --- | --- | --- | --- | --- | --- | --- |
| Green phosphor screen | | | | | | |
| (Example 1) | 50 | 20 | 31.3 | [A] | [A] | 100 |
| (Example 2) | 40 | 15 | 33.3 | [A] | [A] | 98 |
| (Example 3) | 30 | 15 | 25.0 | [A] | [A] | 100 |
| (Example 4) | 60 | 30 | 25.0 | [A] | [A] | 100 |
| (Example 5) | 70 | 40 | 21.9 | [A] | [A] | 97 |
| (Example 6) | 50 | 30 | 20.8 | [A] | [A] | 95 |
| Comparative Example 1 | 30 | 10 | 37.5 | [A] | [C] | |
| Comparative Example 2 | 30 | 20 | 18.8 | [B] | [A] | |
| Comparative Example 3 | 45 | 30 | 18.8 | [C] | [B] | |
| Comparative Example 4 | 70 | 20 | 43.8 | [A] | [C] | |
| Comparative Example 5 | 50 | 40 | 15.6 | [C] | [C] | |

These phosphors were found to be better dispersed in settling solutions than zinc silicate or gadolinium oxysulfide phosphors of the prior art, and better luminescent screens were obtained with respect to comparable particle sizes.

On each of the luminescent screen obtained was formed an organic material film by using the lacquer filming method. Subsequently, an aluminum film was vapor-deposited, followed by baking, and thereafter an electron gun was mounted to complete a cathode-ray tube. The relative values of the cathode-ray tube luminances are also shown in Table 1. Some fluctuation in the cathode-ray tube luminances are observed among the examples. They were caused by the fluctuation in the so-called "dead voltage" which varies during preparation of phosphor and cathode-ray tube. That is, the ing a terbium-activated gadolinium oxysulfide phosphor as the luminescent screen is shown by the curve b in each of FIGS. 3a, 3b and 4.

Figure 5:
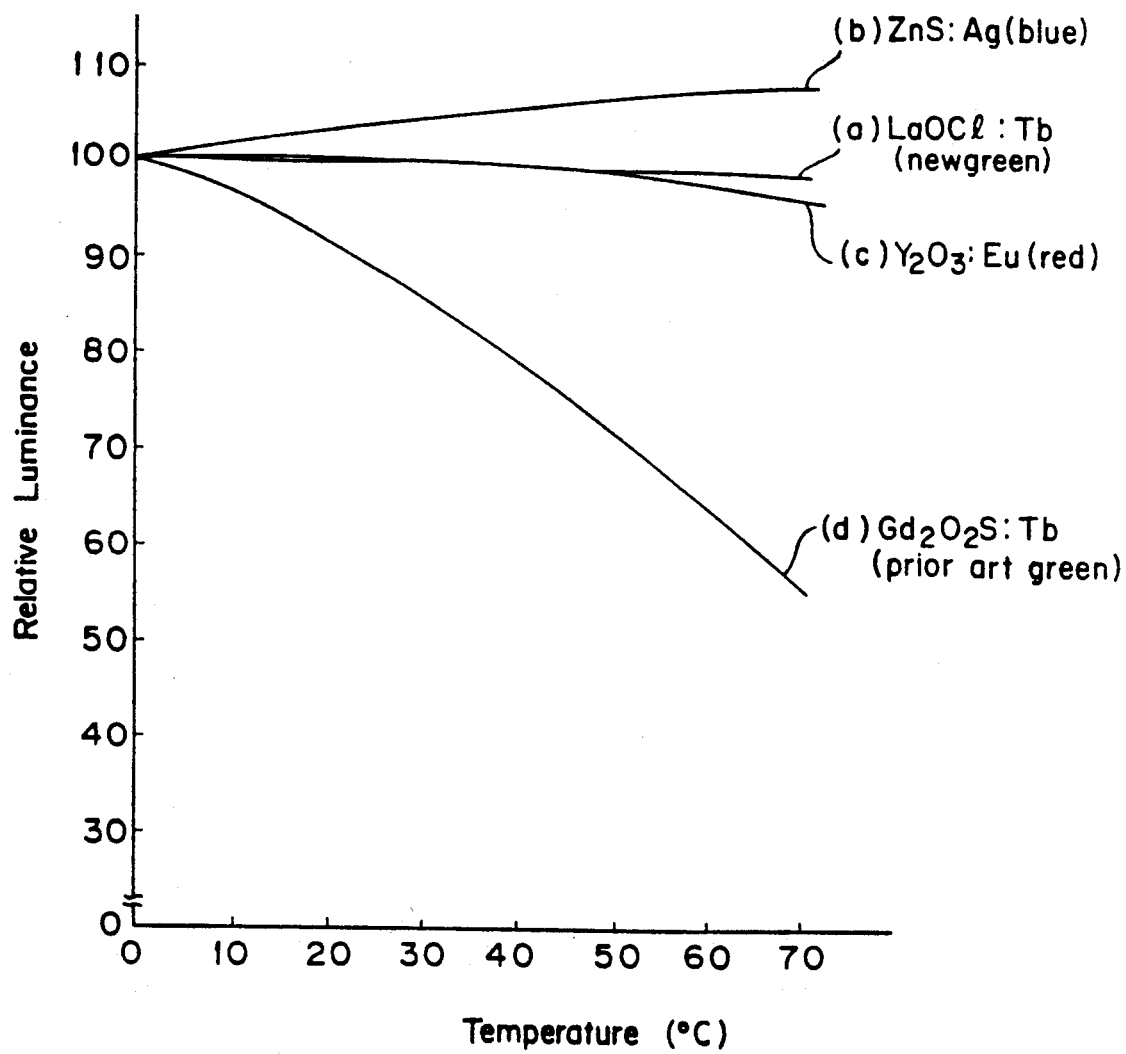

FIG. 5 shows the luminance versus the face plate temperature rise for the above green, blue and red emitting cathode-ray tube. Curve (a) represents the relative luminance of green, curve (b) that of blue, and curve (c) that of red, respectively. The temperature during steady state usage is 70° to 80° C. (Temperature rise is 50° to 60° C.). As apparently seen from the luminance characteristics, the curves behave substantially similarly to each other with the phosphor (a) of the green as the center, and have almost constant values even at a temperature rise of 70° C. or higher. Therefore, stable color pictures which are synthesized by respective color pictures on the cathode-ray tubes can be obtained without color (hue) change during temperature variation.

On the other hand, the curve (d), which shows the luminance characteristics of the terbium-activated gadolinium oxysulfide phosphor (green-emitting phosphor of the prior art), is lowered to about 60% of the initial value at a temperature rise of about 70° C. This causes color change to a more reddish hue of the projected color picture about 10 minutes after start of CRT operation.

Other than the red-emitting phosphor as described above, it is also possible to use the following phosphors:

CaS:Eu, YVO$_4$:Eu.

Also, as for the blue-emitting phosphor, the following phosphors may be available: CaS:Bi, SrSGa$_2$S$_3$:Ce.

Table 2 shows the luminance of the green emission obtained when operating the 7 inch cathode-ray tube of catalogue No. E2884 produced by Toshiba Corporation under the input conditions of 28 kV and 1200 $\mu$A (raster size 13×10 cm$^2$), as compared with two kinds of comparative examples. Comparative Example 1 is a cathode-ray tube of terbium activated gadolinium oxysulfide; and comparative Example 2 is a cathode-ray tube with a structure in which the luminescent screen of the cathode-ray tube of comparative Example 1 is cooled by a fan.

TABLE 2

| | (footlambert) | |
|---|---|---|
| Comparative Example 1 | Comparative Example 2 | Cathode-ray tube used in this invention |
| 3500 | 6200 | 6850 |

As is apparently seen from this Table, the green-emitting cathode-ray tube of the present invention is brighter by 96% as compared with the comparative Example 1 which is used without cooling of the cathode-ray tube and by 10% as compared with the cathode-ray tube having a cooling structure.

Figure 6:
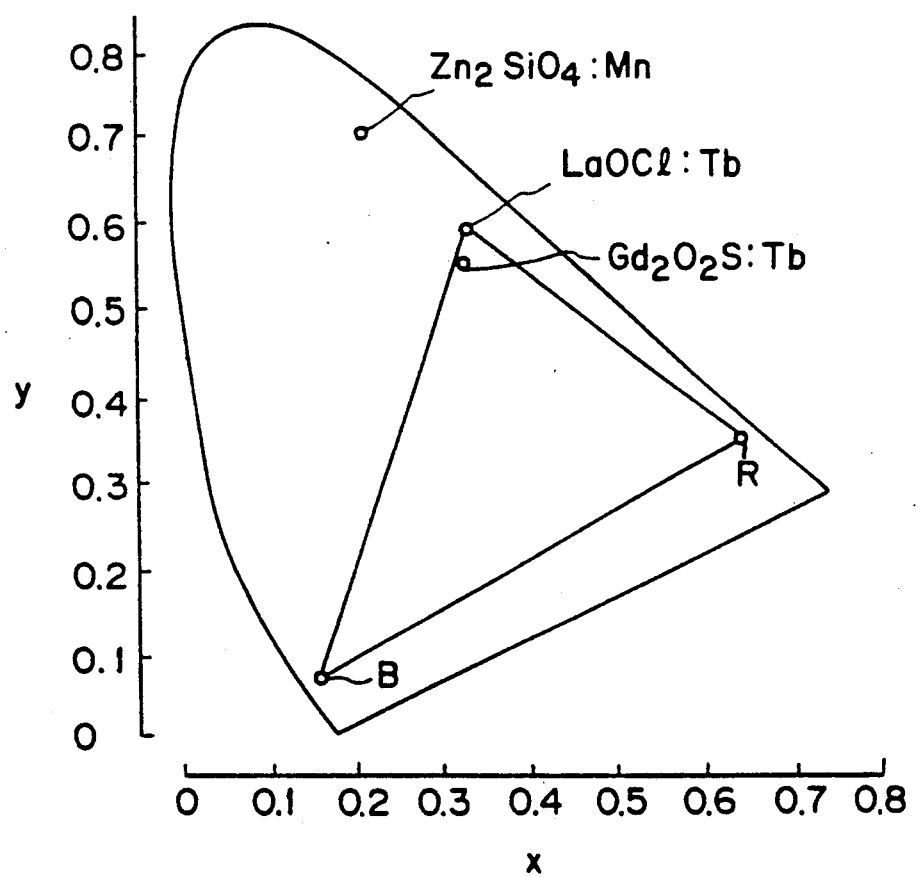
FIG. 6 is a CIE chromaticity characteristic diagram showing the emission chromaticity region.

FIG. 6 shows the emitted color of the cathode-ray tube of Example 3, when measured under the conditions of 28 kV and 1200 $\mu$A, by G1 (x=0.329, y=0.589) on the chromaticity diagram. For comparison, G$_2$ shows the chromaticity point of terbium-activated gadolinium oxysulfide (x=0.325, y=0.543) and G$_3$ that of manganese-activated zinc silicate (x=0.212, y=0.701). The chromaticity point G$_1$ is sufficiently pure green in displaying color to the picture.

When this cathode-ray tube was mounted on the color projection video apparatus, the focus on the projected screen was good, with brighter color pictures as compared with those of the prior art, and it proved to have the advantage of a beautiful green color. Furthermore, due to the small degree of burning of the cathode-ray tube or small lowering in green emitting component by temperature elevation, there occurred no color changes in projected pictures with lapse of time.

We claim:

1. A projection cathode-ray tube for a projection video apparatus, comprising a green-emitting screen including a terbium-activated lanthanum oxychloride phosphor.

2. A projection cathode-ray tube according to claim 1, wherein said cathode-ray tube comprises an inner surface for supporting said green-emitting screen; and wherein the green-emitting screen is formed by a process comprising the steps of:
   a) settling said terbium-activated lanthanum oxychloride phosphor onto the inner surface, wherein the phosphor is settled from a suspension comprising a solution of potassium water glass and barium nitrate, wherein a ratio of the weight concentration of potassium water glass to barium nitrate is in the range between about 20 to about 35; and
   b) removing a resulting supernatant.

3. A method for reproducing a color image on a projection cathode-ray tube for a projection video apparatus, said tube comprising a luminescent screen, which method comprises the step of using an electron beam to excite a green-emitting, terbium-activated lanthanum oxychloride phosphor comprising said luminescent screen.

* * * * *